(12) United States Patent
Chen

(10) Patent No.: US 6,204,861 B1
(45) Date of Patent: Mar. 20, 2001

(54) METHOD AND APPARATUS FOR INDICATING CURVED LINE ON DISPLAY PANEL OF COMPUTER DEVICE

(75) Inventor: Gong Chen, Nagoya (JP)

(73) Assignee: Kobundo Co., Ltd., Nagoya (JP)

( * ) Notice: Subject to any disclaimer, the term of this patent is extended or adjusted under 35 U.S.C. 154(b) by 0 days.

(21) Appl. No.: 09/061,279

(22) Filed: Apr. 17, 1998

(30) Foreign Application Priority Data

Apr. 18, 1997 (JP) .................................................. 9-102227

(51) Int. Cl.$^7$ .................................................. G06T 11/20
(52) U.S. Cl. .................................................. 345/442
(58) Field of Search .................................................. 345/441, 442, 345/443

(56) References Cited

U.S. PATENT DOCUMENTS

| 5,410,645 | * | 4/1995 | Ooka et al. | 345/442 |
| 5,412,770 | * | 5/1995 | Yamashita et al. | 345/442 |
| 5,459,821 | * | 10/1995 | Kuriyama et al. | 345/442 |
| 5,557,719 | * | 9/1996 | Ooka et al. | 345/441 |
| 5,608,856 | * | 3/1997 | McInally | 345/442 |
| 5,694,535 | * | 12/1997 | Broekhuijsen | 345/442 |
| 5,717,905 | * | 2/1998 | Iwamoto et al. | 345/442 |
| 5,771,341 | * | 6/1998 | Huddy | 345/442 X |
| 5,859,647 | * | 1/1999 | Kurumida | 345/442 |

OTHER PUBLICATIONS

Graphics Gems edited by Glassner, pp. 587–594, 1990.

\* cited by examiner

*Primary Examiner*—Mark R. Powell
*Assistant Examiner*—Chanté E. Harrison
(74) *Attorney, Agent, or Firm*—Nixon & Vanderhye P.C.

(57) ABSTRACT

A method is described for indicating a curved line on a display panel of a computer device provided with a coordinate designation device. First, second and third position coordinates designated by the coordinate designation device are respectively set as a starting point, a terminal point and a handle point at the terminal point, connecting the starting point to the terminal point. A Bezier curve is indicated on the display panel of the computer device in such manner that each inclination of the Bezier curve at the starting the terminal points in varied in accordance with change of the handle point.

14 Claims, 12 Drawing Sheets

METHOD AND APPARATUS FOR INDICATING CURVED LINE ON DISPLAY PANEL OF COMPUTER DEVICE

BACKGROUND OF THE INVENTION

1. Field of the Invention

The present invention relates to a method and apparatus for indicating a curved line for graphic arts, designation of an extent of an image data on a display panel of a computer device.

2. Description of the Prior Art

As one of methods of indicating a curved line on a display panel of a computer device provided with a coordinate designation device or producing image data indicative of the curved line, there has been proposed a method of connecting a plurality of Bezier curves for indication of a desired curved line. As shown in FIG. 14, the Bezier curves each are in the form of a cubic curve with control points defined by a starting point, a second handle at the starting point, a terminal point and a first handle point at the terminal point in sequence. In the cubic curve, an inclination of a straight line connecting the starting point to the second handle point is defined as an inclination of the cubic curve at the starting point, and an inclination of a straight line connecting the terminal point to the first handle point is defined as an inclination of the cubic curve at the terminal point.

The position coordinate of each control point of the cubic Bezier curves is determined as follows: A position coordinate of a base point $P_{n-1}$ defined as a terminal point of a Bezier curve of the number "n−1" and a starting point of a Bezier curve of the number "n" is first set at a position coordinate designated by a coordinate designation device, a position coordinate of a first handle point $P_{n-1'}$ at the base point $P_{n-1}$ is set at a position coordinate designated by the coordinate designation device in such a manner that the inclination of the Bezier curve of the number "n−1" at the terminal point becomes a desired inclination, and the position coordinate of the second handle point $P_{n-1''}$ at the base point $P_{n-1}$ is set at a symmetrical position of the first handle point $P_{n-1'}$ relative to the base point $P_{n-1}$. Subsequently, a position coordinate of a base point $P_n$ defined as a terminal point of a Bezier curve of the number "n" and a starting point of a Bezier curve of the number "n+1" is designated by the coordinated designation device, and a position coordinate of a first handle point $P_{n'}$ at the base point $P_n$ is designated by the coordinate designation device in such a manner that the inclination of the Bezier curve of the number "n" at the terminal point $P_n$ becomes a desired inclination. With such setting of the position coordinates described above, a plurality of cubic Bezier curves are defined in sequence thereby to indicate a desired curve and to produce data indicative of the desired curve.

When it is desired to change the cubic Bezier curves or to change the data of the cubic Bezier curves, the position coordinate of the second or first handle point for defining each inclination of the cubic Bezier curves at the starting and terminal points is changed to a position designated by the coordinate designation device. In such a conventional method of indicating a desired curve, when the position coordinate of the first handle point $P_{n-1'}$ at the terminal point $P_{n-1}$ is designated by the coordinate designation device, the position coordinate of the second handle point $P_{n-1}$ defining the inclination of the following Bezier curve at the starting point is automatically set. When the terminal point $P_n$ of the following Bezier curve and first handle point at the terminal point $P_n$ are designated, the inclination of the following Bezier curve at the starting point is retained in a condition defined by the second handle point $P_{n-1}$. Accordingly, such a Bezier curve as shown by a dot and dash line in FIG. 14 may not be defined. As a result, renewal of the position coordinate of the second handle point at the terminal point has been frequently required for defining a desired Bezier curve. In addition, variation of a Bezier curve caused by change of a position coordinate of each handle point may not be directly estimated by a user. It is, therefore, difficult for the user to change the display of the Bezier curve to a desired curve.

SUMMARY OF THE INVENTION

It is, therefore, a primary object of the present invention to provide a method and apparatus capable of effectively indicating a curved line in a desired configuration without causing the problems discussed above.

Another object of the present invention is to provide a method and apparatus capable of changing a curved line indicated on a display panel in a simple manner.

According to an aspect of the present invention, there is provided a method of indicating a curved line on a display panel of a computer device provided with a coordinate designation device, comprising the steps of setting first, second and third position coordinates designated by the coordinate designation device respectively as a starting point, a terminal point and a handle point at the terminal point, connecting the starting point to the terminal point, and indicating a Bezier curve on the display panel of the computer device in such manner that each inclination of the Bezier curve at the starting and terminal points is varied in accordance with change of the handle point.

In a practical embodiment of the present invention, it is preferable that the method of indicating the curved line further comprises the steps of setting the terminal point of the Bezier curve as a starting point of a new Bezier curve, setting fourth and fifth position coordinates newly designated by the coordinate designation device respectively as a terminal point of the new Bezier curve and a handle point at the terminal point of the new Bezier curve, connecting the starting the terminal points of the new Bezier curve to one another and indicating the new Bezier curve on the display panel of the computer device in such a manner that each inclination of the new Bezier curve at its starting and terminal points is varied in accordance with change of the handle point defined by the fifth position coordinate.

According to another aspect of the present invention, there is provided an apparatus for indicating a curved line on a display panel of a computer device provided with a coordinate designation device, which comprises means for setting first, second and third position coordinates designated by the coordinate designation device respectively as a starting point, a terminal point and a handle point at the terminal point, and means for connecting the starting point to the terminal point and for indicating a Bezier curve on the display panel of the computer device in each manner that each inclination of the Bezier curve at the starting and terminal points is varied in accordance with change of the handle point.

According to a further aspect of the present invention, there is provided an apparatus for indicating a curved line on a display panel of a computer device provided with a coordinate designation device, which comprises means for setting first and second position coordinates designated in pairs by the coordinate designation device respectively as a first base point and a first handle point at the first base point, means for setting third and fourth position coordinates designated by the coordinate designation device respectively as a second base point and a second handle point at the second base point, means for connecting the first base point to the second base point, and means for indicating a Bezier curve on the display panel of the computer device in such a manner that each inclination of the Bezier curve at the first and second base point is varied in accordance with change of the second handle point.

According to an aspect of the present invention, there is provided a recording media adapted for use in an apparatus for indicating a curved line on a display panel of a computer device provided with a coordinate designation device, wherein the recording media is programmed to set first, second and third position coordinates designated by the coordinate designation device respectively as a starting point, a terminal point and a handle point at the terminal point and to connect the starting and terminal points to one another for indicating a Bezier curve in such a manner that each inclination of the Bezier curve at the starting and terminal points is varied in accordance with change of the handle point.

According to a still another aspect of the present invention, there is provided a recording media adapted for use in an apparatus for indicating a curved line on a display panel of a computer device provided with a coordinate designation device, wherein the recording media is programmed to set first and second position coordinates designated in pairs by the coordinate designation device respectively as a first base point and a first handle point at the first base point and to connect the first base point to the second base point for indicating a Bezier curve on the display panel of the computer device in such a manner that each inclination of the Bezier curve at the first and second base points is varied in accordance with change of the second handle point.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF PREFERRED EMBODIMENT

Figure 1:
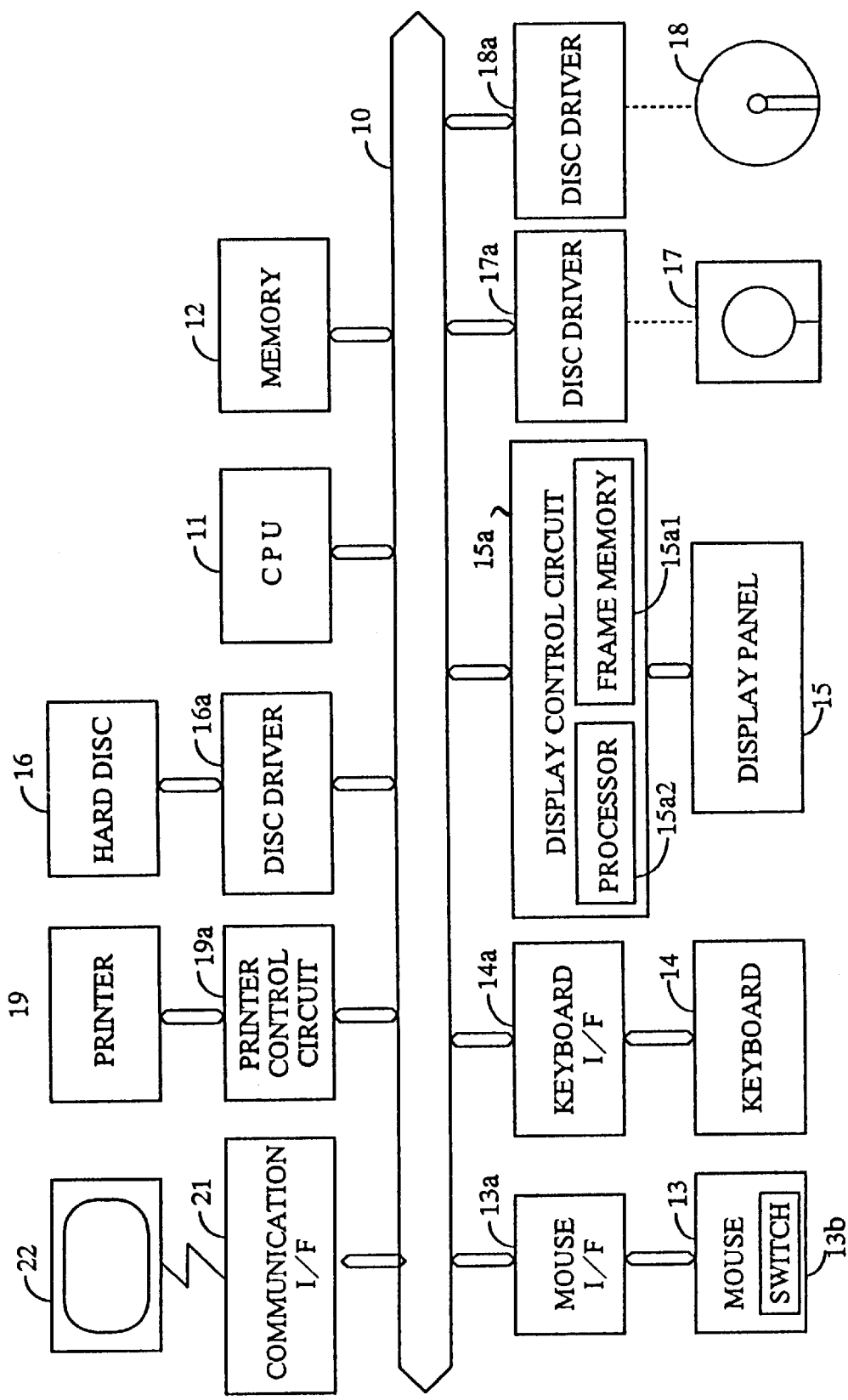
FIG. 1 is a block diagram of an apparatus for indicating a curved line on a display panel of a computer device in accordance with the present invention.

Prior to detailed description of a preferred embodiment of the present invention, a Bezier curve used in the embodiment will be briefly explained as follows for a better understanding of the present invention. A Bezier curve of n order with control points $P_0{}^n, P_1{}^n, \ldots, P_n{}^n$ positioned on a plain surface is represented by the following equation (1) using a parameter value t in an extent more than 0 and less than 1.

$$P^n(t) = \sum_{i=0}^{n} \frac{n!}{i!(n-i)!} t^i (1-t)^{n-1} P_i^n \tag{1}$$

The control point $P_0{}^n$ is defined as a base point of the Bezier curve, and the control point $P_n{}^n$ is defined as a terminal point of the Bezier curve. An inclination of the Bezier curve at the starting point (or the control point $P_0{}^n$) becomes equal to an inclination of a straight line between the control points $P_0{}^n$ and $P_1{}^n$, while an inclination of the Bezier curve at the terminal point (or the control point $P_n{}^n$) becomes equal to an inclination of a straight line between the control points $P_n{}^n$ and $P_{n-1}{}^n$. In the present invention, a square Bezier curve $P^2(t)$ and a cubic Bezier curve $P^3(t)$ are represented by the following equations (2) and (3), respectively.

$$P^2(t) = (1-t)^2 \cdot P_0{}^2 + 2(1-t) \cdot t \cdot P_1{}^2 + t^2 \cdot P_2{}^2 \tag{2}$$

$$P^3(t) = (1-t)^3 \cdot P_0{}^3 + 3(1-t)^2 \cdot t \cdot P_1{}^3 + 3(1-t) \cdot t^2 \cdot P_2{}^3 + t^3 \cdot P_3{}^3 \tag{3}$$

When the square Bezier curve $P^2(t)$ is given by three control points $P_0{}^2, P_1{}^2$ and $P_2{}^2$, three control points $P_0{}^3, P_1{}^3$ and $P_3{}^3$ of a cubic Bezier curve equivalent with the square Bezier curve are obtained in such a manner as described below. Using appropriate values ta, tb as the parameter value t, appropriate two points pa ($=P^2(ta)$), pb ($=P^2(tb)$) on the square Bezier curve are calculated. Assuming that the calculated two points pa, pb are considered as two points $P^3(ta)$, $P^3(tb)$ on a cubic Bezier curve with respect to the parameter value ta, tb, the following equations (4) and (5) are given.

$$pa = (1-ta)^3 \cdot P_0{}^3 + 3(1-ta)^2 \cdot ta \cdot P_1{}^3 + 3(1-tb) \cdot tb^2 \cdot P_2{}^3 + tb^3 \cdot P_3{}^3 \tag{4}$$

$$pb = (1-tb)^3 \cdot P_0{}^3 + 3(1-tb)^2 \cdot tb \cdot P_1{}^3 + 3(1-tb) \cdot tb^2 \cdot P_2{}^3 + tb^3 \cdot P_3{}^3 \tag{5}$$

In the equations (4) and (5), the first and fourth control points $P_0{}^3$ and $P_3{}^3$ correspond with the first and third control points $P_0{}^2$ and $P_2{}^2$. Thus, based on the equations (4) and (5), the second and third control points $P_1{}^3$ and $P_2{}^3$ on the cubic Bezier curve are obtained by the following equations (6) and (7), respectively.

$$P_1{}^3 = \{(1-ta) \cdot ta^2 \cdot A - (1-tb) \cdot tb^2 \cdot B\}/C \tag{6}$$

$$P_2{}^3 = \{(1-tb)^2 \cdot tb \cdot B - (1-ta)^2 \cdot ta \cdot A\}/C \tag{7}$$

Provided that, A, B, C in the equations (6) and (7) are represented by the following equations (8)–(10).

$$A = pb - (1-tb)^3 \cdot P_0 - tb^3 \cdot P_3{}^3 \tag{8}$$

$$B = pa - (1-ta)^3 \cdot P_0 - ta^3 \cdot P_3{}^3 \tag{9}$$

$$C = (1-ta) \cdot (1-tb) \cdot (ta-tb) \cdot ta \cdot tb \quad (9)$$

Figure 2:
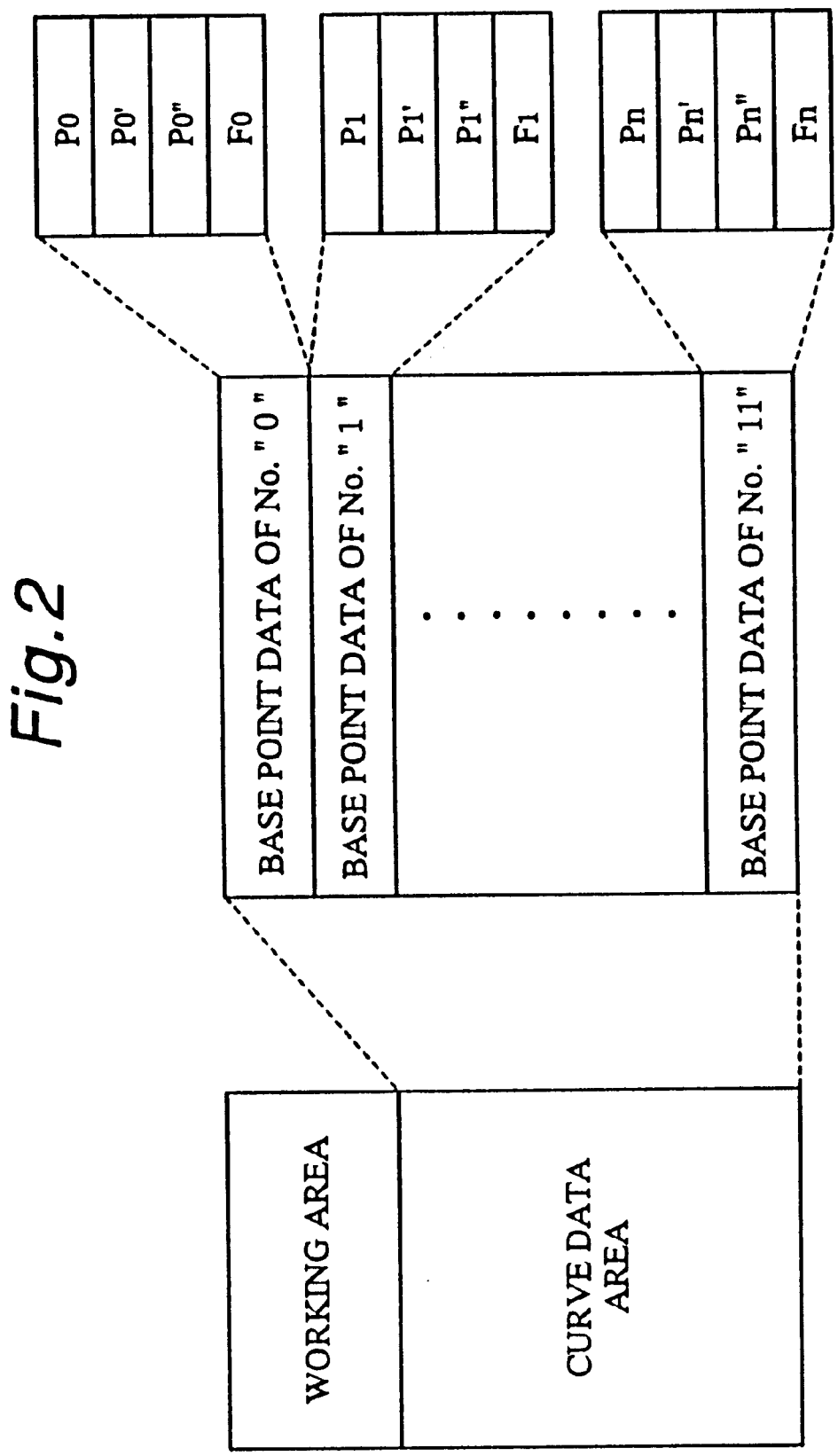
FIG. 2 is a format of a memory shown in FIG. 1.

Hereinafter, a computer device in the embodiment of the present invention will be described with reference to FIG. 1 of the drawings. As shown in FIG. 1, the computer device includes a central processing unit or CPU 11 and a memory 12 connected to a data bus 10, a coordinate designation device composed of a mouse 13 and a keyboard 14 connected to the data bus 10 respectively through a mouse interface 13a and a keyboard interface 14a and a display panel 15 connected to the data bus 10 through a display control circuit 15a. As shown in FIG. 2, the memory 12 has a working area adapted to temporarily memorize input data to be used by the CPU 11 and a curve data area adapted to memorize image data indicative of a desired curved line.

In this embodiment, the desired curved line is represented by a combination of a plurality of cubic Bezier curves connecting plural base points in sequence. The data indicative of the desired curved line includes base point data P indicative of each position coordinate of the base points, handle point data P', P" indicative of first and second handle points of each based point and handle display data F of each base point data P. Each base point is defined as fourth and first control points of the cubic Bezier curve whose terminal and starting points are defined by the base point. The first handle point is defined as a third control point of the cubic Bezier curve the terminal point of which is defined by the corresponding base point. The first handle point is adapted to determine an inclination of the Bezier curve at the base point. The second handle point is defined as a second control point of the cubic Bezier curve the starting point of which is defined by the corresponding base point. The second handle point is adapted to determine an inclination of the Bezier curve at the base point. When the handle display data F is as "1", the handle line related to the cubic Bezier curve is indicated on the display panel. When the handle display data F is as "0", the handle line is not indicated on the display panel.

The data P, P', P", F described above are numbered in sequence and memorized in the memory 12. In the following description, the number of each Bezier curve is given by the number of the base point defined as the terminal point, and the number of the handle line is given by the number of the corresponding base point.

The mouse 13 is provided with a manual on-off switch 13b, which mouse 13 is operated by a user to continuously designate a position coordinate on the display panel 15. The keyboard 14 is provided with a plurality of input elements such as ten-keys, letter keys and the like and a detection switch for detecting each operation of the input elements. The display control circuit 15 a includes a frame memory 15a1 for memorizing display information of each picture element on the display panel 15 and an image processor 15a2 for indicating an image, a letter or the like on the display panel 15 on a basis of the display information memorized in the frame memory 15a1 and for rewriting the memorized display information by an exclusive OR method when applied with input data from the data bus 10. When an original display information is rewritten by the exclusive OR method even times, the rewritten display information is returned to the original display information. Thus, the image processor 15a2 acts to return the rewritten display information to the original information when executed processing for rewriting the display information and to delete an image indicated on the display panel. When applied with position coordinates of two points, the processor 15a2 rewrites the memorized display information corresponding with position coordinates on a straight line between the two points to automatically indicate the straight line between the two points on the display panel or delete the indicated straight line.

The computer device is provided with disc drivers 16a to 18a connected to the data bus 10. The disc drivers 16a to 18a are arranged to read out data from a hard disc 16, a flexible disc 17 and a compact disc 18 or write the date into the discs 16 to 18. The discs 16 to 18 each are utilized as an external memory device for preliminarily memorizing the programs and curved line data described above and for memorizing the curved line data stored in the memory 12. In addition, the computer device is further provided with a printer 19 connected to the data bus 10 through a printer control circuit 19a for printing curved lines plotted on the display panel and a communication interface 21 connected to the data bus 10 for communication with an external host computer 22.

Hereinafter, operation of the computer device will be described with reference to FIGS. 3 to 11. Assuming that the computer device has been activated to initiate execution of a program for production of a curved line, a portion of the entirety of a main program and a timer interrupt program shown by flow charts in FIGS. 3 to 11 are transferred to the working area of memory 12 from either one of the discs 16 to 18, and the CPU 11 starts to execute the programs at step 100 shown in FIG. 3. During execution of the main program shown in FIG. 3, the CPU 11 repeats execution of the timer interrupt program upon each lapse of a predetermined time.

Immediately after started execution of the main program, the CPU 11 reads out data indicative of a position coordinate pm designated by the mouse 13 at step 102 and causes the pointer at step 104 to indicate the designated coordinated pm on the display panel 15 under control of the display control circuit 15a. In this instance, the pointer is utilized to inform a user of the designated coordinate on the display panel 15.

Figure 11:
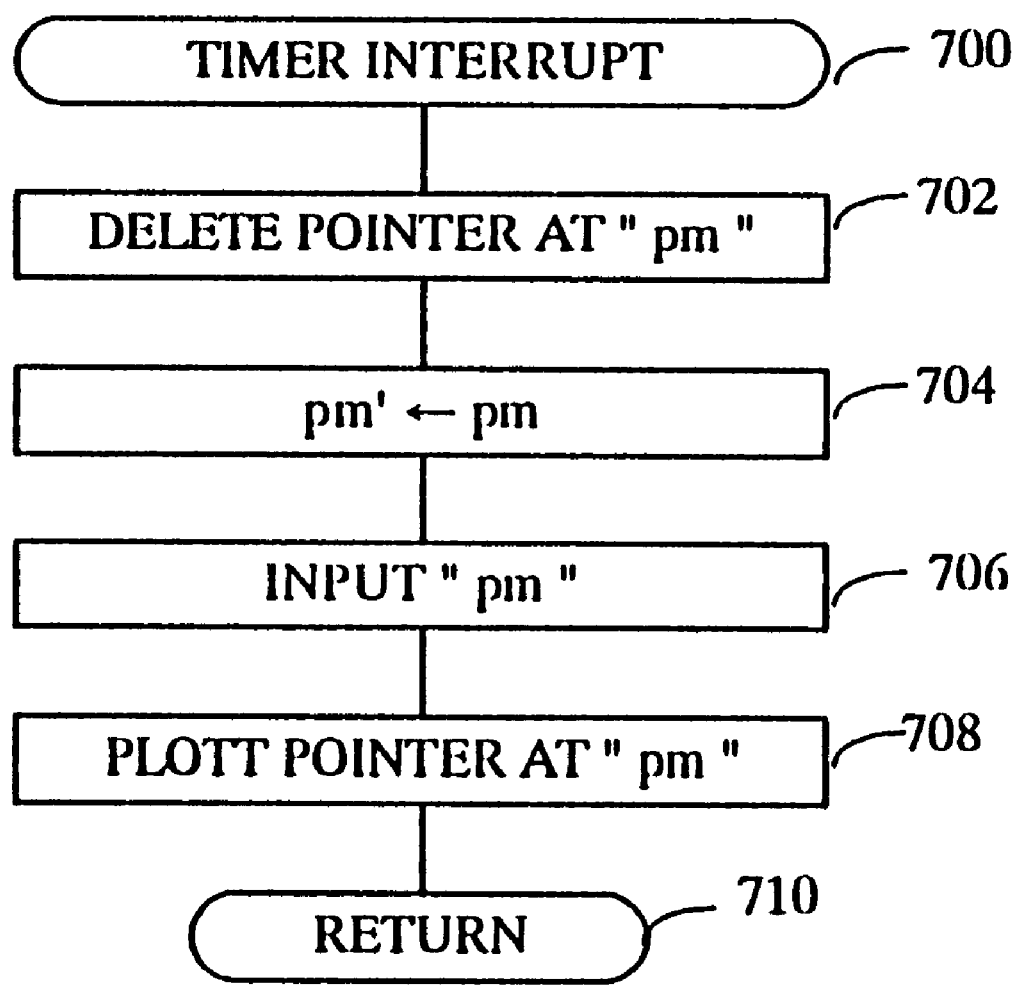
FIG. 11 is a flow chart of a timer interrupt program executed by the computer.

In this embodiment, the timer interrupt program of FIG. 11 is adapted to renew the value of the designated coordinate pm in response to input data applied from the mouse 13 and to renew the indication of the pointer on the display panel 15. When started execution of the timer interrupt program at step 700 of FIG. 11, the CPU 11 deletes at step 702 the pointer indicated at the designated coordinated pm on the display panel 15 under control of the display control circuit 15a. After deleted the pointer, the CPU 11 sets a value of a previously designated coordinate pm' to the value of the designated coordinated pm at step 704. Subsequently, the CPU 11 reads out at step 706 the value of the designated coordinated pm and causes the pointer at step 708 to indicate the designated coordinated pm on the display panel 15 under control of the display control circuit 15a. Thereafter, the CPU 11 finishes execution of the timer interrupt program at step 710. With the repetitive execution of the timer interrupt program, the pointer is always indicated at a position designated by the mouse 13 on the display panel 15. In addition, the previously designated coordinate pm' is compared with the newly designated coordinate pm as will be described later to determine variation of the position coordinate designated by the mouse 13.

Figure 3:
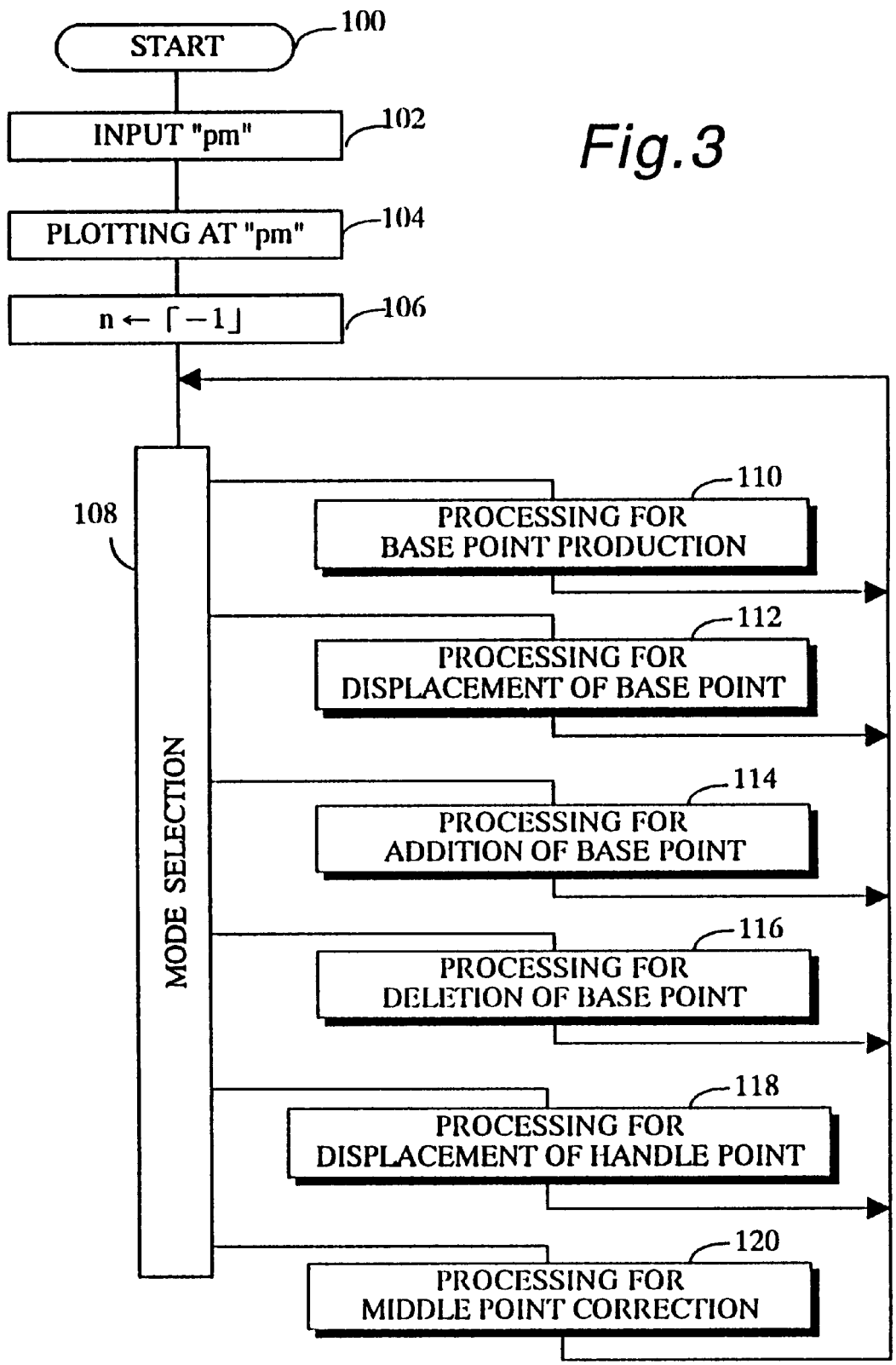
FIG. 3 is a flow chart of a main program executed by the computer shown in FIG. 1.

During execution of the main program shown in FIG. 3, the CPU 11 reads out at step 102 the value of the designated coordinate pm indicates a pointer at a position coordinate of pm on the display panel 15 and sets at step 106 a terminal designation variable "n" to "−1". In this embodiment, the terminal designation variable "n" represents the number of a last base point. After setting the terminal designation variable "n", the CPU 11 repeats processing at step 108 to 120. At step 108, the CPU 11 determines an execution mode for production of a curved line. For example, the execution mode is selected from a set of different execution modes by designation of a switch position indicated on the display panel. If in this instance, a base point production mode is selected as the execution mode at step 108, the program proceeds to step 110 where the CPU 11 executes processing for base point production shown in FIG. 4.

The processing for base point production is executed to newly produce a base point and its first and second handle points for defining a desired Bezier curve. After started execution of the processing for base point production at step 2000, the CPU 11 determines at step 202 whether the mouse switch 13b has been turned on or not. When the mouse switch 13b is turned on after the mouse 13 is operated by the user to indicate the pointer at a desired position on the display panel 15, the CPU 11 determines a "YES" answer at step 202 and causes the program to proceed to step 204 for setting a new base point and its first and second handle points. At step 204, the CPU 11 adds "1" to the terminal point designation variable "n" set as "0" by initialization at step 106 shown in FIG. 3. As a result, the number of the base point and its first and second handle points newly set by operation of the mouse switch 13b is given by addition of "1" to the number of a preceding standard point and its first and second handle points previously set by operation of the mouse switch 13b. When the program proceeds to step 206, the CPU 11 causes the memory 12 to memorize the position coordinate pm designated by the mouse 13 as data Pn, Pn', Pn" representing the base point of the number "n" and its first and second handle points. In this instance, a handle indication data $F_n$ of the number "n" is memorized as "0" in the memory 12.

After processing at step 204 and 206, the CPU 11 determines at step 208 whether the terminal designation variable "n" is more than "1" or not. As the terminal designation variable "n" is set as "1" at step 204, the CPU 11 determines a "No" answer at step 208 and causes the program to proceed to step 210 for waiting a condition where the mouse switch 13b is turned off. When the mouse switch 13b is turned off, the program proceeds to step 234 where the CPU 11 finishes execution of the processing for base point production. Assuming that the terminal point designation variable "n" indicative of the number of a last base point and its first and second handle points is more than "1" in a condition where a plurality of base points and their first and second handle points have been set previously, the CPU 11 determines a "YES" answer at step 208 and causes the program to proceed to step 212.

Figure 5:
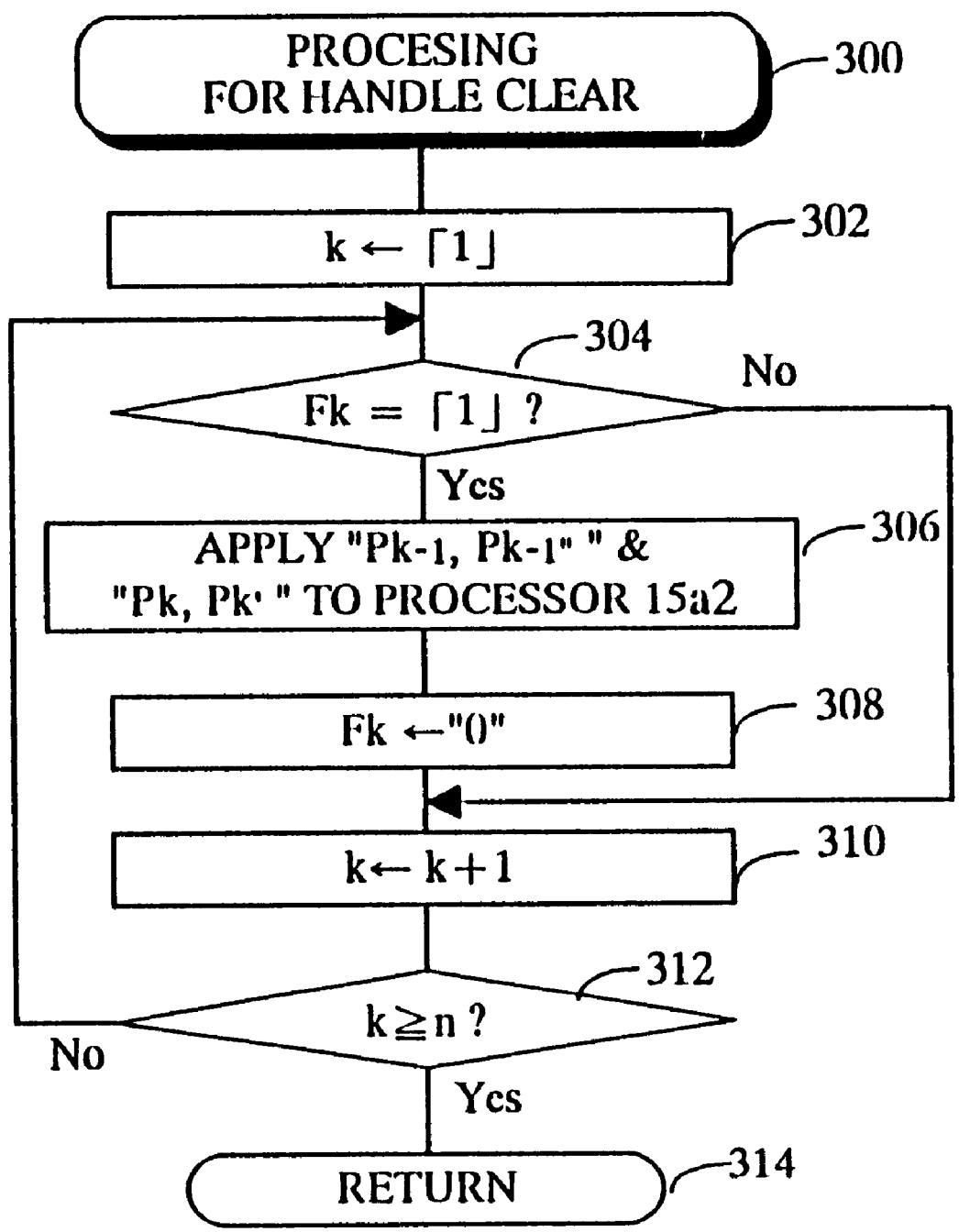
FIG. 5 is a flow chart of a handle-clear processing shown in FIG. 4.
Figure 6:
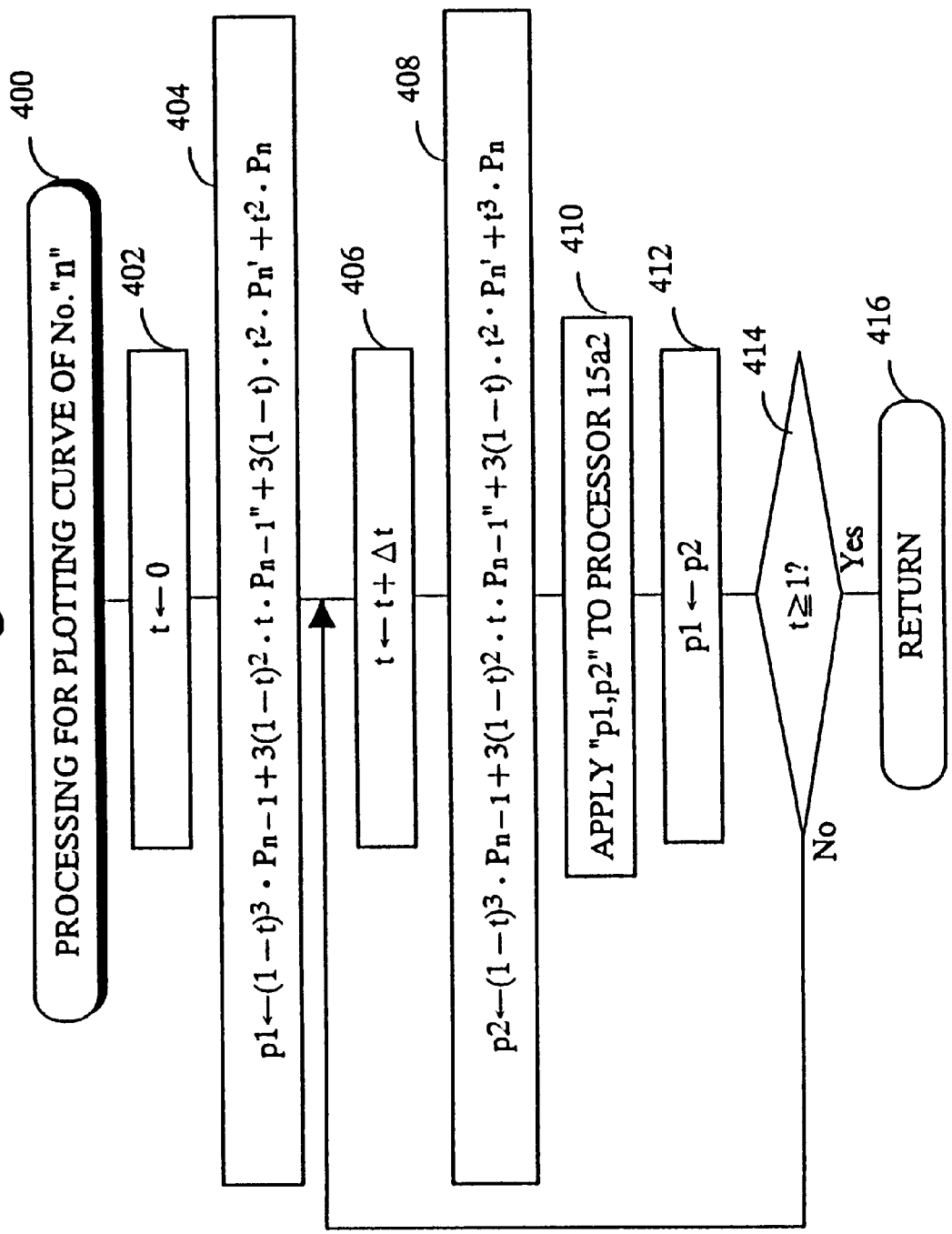
FIG. 6 is a flow chart of processing for plotting a curved line of No. "n" shown in FIG. 4.

At step 212, the CPU 11 executes handle-clear processing for deletion of all the handle lines indicated on the display panel 15 as shown in FIG. 5. After started the handle-clear processing at step 300, the CPU 11 sets a variable "k" to "1" at step 302 and repeats execution of processing at step 304 to 312. Thus, the CPU 11 adds "1" to the variable "k" at step 310 and determines a handle indication data $F_k$ at step 304. When the handle indication data $F_k$ is set as "1" in a condition where the second handle line of the number "k−1" and the first handle line of the number "k" are indicated on the display panel 15 as will be described later, the CPU 11 applies at step 306 the base point data $P_{k-1}$ and its second handle line data $P_{k-1}$" of the number "k−1" and the base point data $P_k$ and its first handle line data $P_k$' of the number "k" to the processor 15a2 to delete the handle lines indicated on the display panel 15 and sets at step 308 the memorized handle indication data $F_k$ to "0". The processing at step 304 to 312 is continued until the variable "k" becomes larger than the terminal designation variable "n" during determination of all the handle indication data Fk. As a result, all the handle lines indicated on the display panel 15 are deleted. After execution of the processing at step 304 to 312, the CPU 11 finishes the handle clear processing at step 314.

Figure 4:
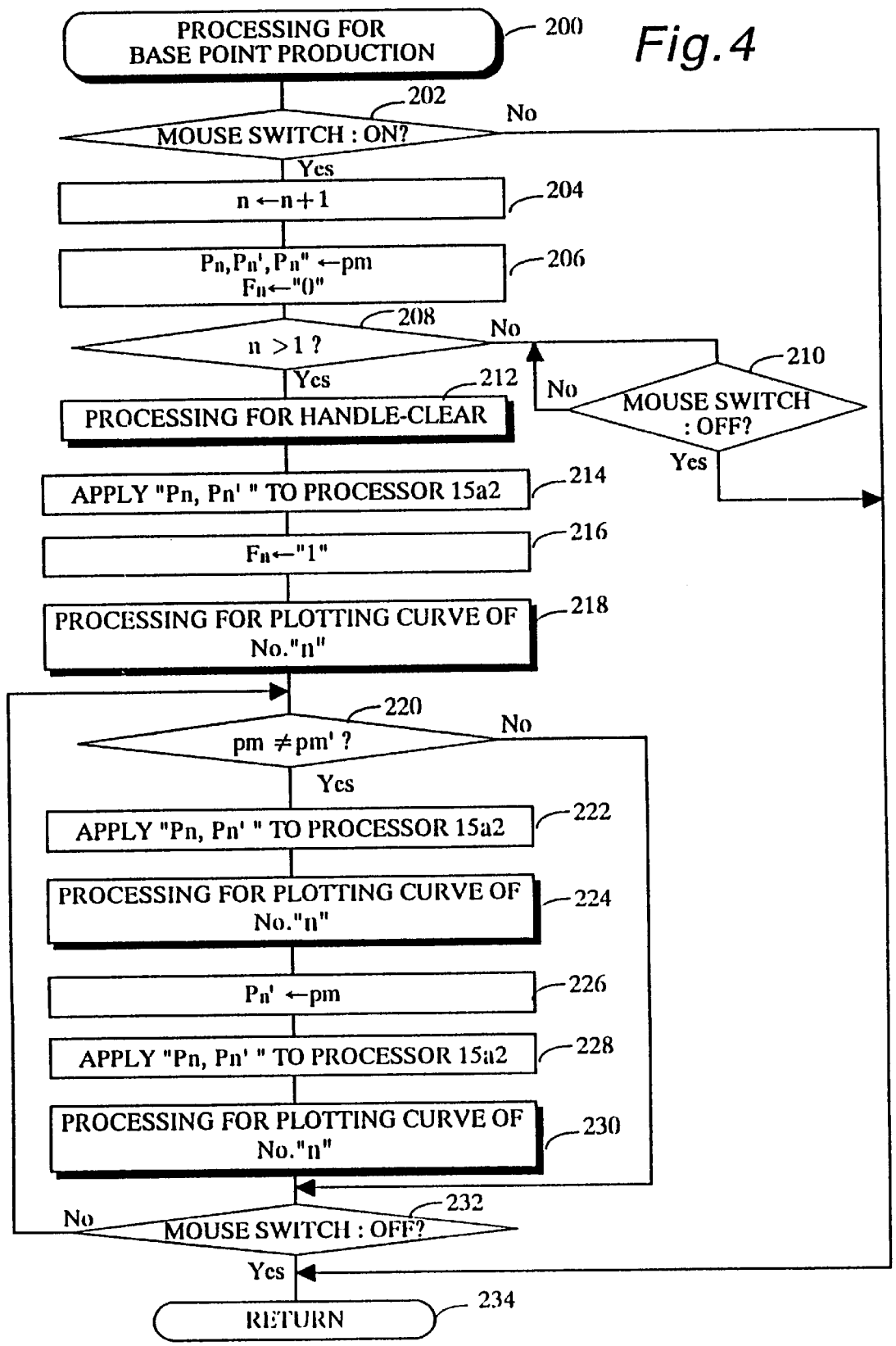
FIG. 4 is a flow chart of processing for base point production shown in FIG. 3.

Thereafter, the CPU 11 applies at step 214 of FIG. 4 the base point data Pn and its first handle point data Pn' of the number "n" to the image processor 15a2 to indicate the first handle line of the number "n" on the display panel 15. In this instance, the first handle line is indicated as one point since the base point data Pn is the same as the first handle point data Pn'. Subsequently, the CPU 11 sets at step 216 the memorized handle designation data Fn of the number "n" to "1" and executives at step 218 processing for plotting a curved line of the number "n" as shown in detail in FIG. 6. The processing for plotting the curved line of the number "n" is executed to indicate a Bezier curve of the number "n" on the display panel 15 or delete the Bezier curve. The starting and terminal points of the Bezier curve are respectively defined by the previous base point of the number "n−1" and the newly set base point of the number "n".

After started execution of the processing for plotting the curved line of the number "n" at step 400, the CPU 11 sets a parameter "t" to "0" at step 402 and calculates at step 404 the following equation (11) using the parameter "t" to define a first coordinate p1.

$$p1=(1-t)^3 \cdot P_{n-1}+3(1-t)^2 \cdot t \cdot P_{n-1}{}''+3(1-t) \cdot t^2 \cdot P_{n'}+t^2 \cdot P_n \qquad (11)$$

As the equation (11) corresponds with the equation (3), the first coordinate p1 is defined as the starting point of the Bezier curve of the number "n" when the parameter "t" is defined as "0".

Subsequently, the CPU 11 adds at step 406 a minimal value Δt to the parameter "t" and calculates the following equation (12) using the parameter "t" added with the minimal value Δt to define a second coordinate p2.

Subsequently, the CPU 11 adds at step 406 a minimal value Δt to the parameter "t" and calculates the following equation (12) using a parameter "t" added with the minimal value Δt to define a second coordinate p2.

$$p2=(1-t)^3 \cdot P_{n-1}+3(1-t)^2 \cdot t \cdot P_{n-1}{}''+3(131\ t) \cdot t^2 \cdot P_{n'}+t^3 \cdot P_n \qquad (12)$$

As the equation (12) as well as the equation (11) corresponds with the equation (3), the second coordinate p2 is defined as one point on the Bezier curve of the number "n" when the parameter "t" is defined as "Δt". In addition, a distance between the coordinates p1 and p2 is defined by the minimal value "Δt".

Thus, CPU 11 applies at step 410 the calculated coordinated p1 and p2 to the processor 15a2 to indicate a minimal line segment between the coordinates p1 and p2 on the display panel 15. Thereafter, the CPU 11 sets at step 412 the value of first coordinate p1 to the second coordinate p2 and determines at step 414 whether the parameter "t" is more than "1" or not. If the answer at step 414 is "No", the CPU 11 returns the program to step 406. In this instance, the value of parameter "t" is defined as "2Δt" by processing at step 406, and the second coordinate p2 is calculated by processing at step 408 using the parameter "2Δt". Thus, the processor 15a2 is applied with the preceding second coordinate p2 previously calculated at step 408 and the following second coordinate p2 newly calculated at step 408 to indicate a new minimal line segment in connection to the previous line segment on the display panel 15.

Thereafter, the processing at step 406 to 414 is repeatedly executed to indicate a Bezier curve of the number "n" as a series of continuously connected line segments on the display panel 15. When the Bezier curve is completely indicated from its starting point to its terminal point by increment of the parameter "t" to "1", the CPU 11 determines a "Yes" answer at step 414 and finishes execution of the processing for plotting the curve of the number "n" at step 416.

After execution of the processing for plotting the curved line of the number "n", the CPU 11 repeats execution of processing at step 220 to 232 shown in FIG. 4 until the mouse switch 13b is turned off. The processing at step 220 to 232 is executed to renew the first handle point data $P_{n'}$ in response to input data applied from the mouse 13 and to renew the indication on the display panel 15 based on the renewed first handle point data. When the mouse 13 is operated by the user to renew the designated coordinate pm, the CPU 11 determines a "Yes" answer at step 220 and executes at step 222 and 224 the same processing as that at step 214 and 218 to delete the first handle line of the number "n" and the Bezier curve indicated on the display panel 15. Subsequently, the CPU 11 renews at step 226 the first handle point data $P_{n'}$ of the number "n" to the renewed position coordinate pm and executes at step 228 and 230 the same processing as that at step 214 and 218. As a result, the first handle line of the number "n" and the Bezier curve based on the renewed first handle point data $P_{n'}$ are indicated on the display panel 15.

While the foregoing processing is being executed in a condition where the mouse switch 13b is maintained in its on-position, the mouse 13 is operated by the user to renew the first handle position of the number "n" indicated on the display panel at step 228 in such a manner that the Bezier curve is formed in a desired configuration. In turn, the mouse switch 13b is turned off when the Bezier curve has been formed in the desired configuration. In this instance, the CPU 11 determines a "Yes" answer at step 232 and finishes once the processing for base point production at step 234.

From the above description, it will be understood that at each time when the switch 13b of mouse 13 is turned on at the base point production mode, the designated coordinate pm is memorized as a new base point data $P_n$ and its first and second handle point data $P_{n'}$ and $P_{n''}$ in the memory 12 by processing at step 206 of the program. When the mouse 12 is operated by the user to renew the designated coordinate pm in a condition where the mouse switch 13b is maintained in its on-position, only the first handle point data $P_{n'}$ newly memorized by processing at step 206 is renewed in response to renewal of the designated coordinate pm by processing at step 226.

In such an instance as described above, the base point of the number "n−1" and its first handle point represented by the base point data $P_{n-1}$ and its second handle point data $P_{n-}$memorized by processing at step 206 are respectively defined as first and second control points, and the first handle point and base point of the number "n" represented by the first handle point data $P_{n'}$ renewed by processing at step 226 and the base point data $P_n$ newly memorized by processing at step 206 are respectively defined as third and fourth control points to indicate a cubic Bezier curve of the number "n" on the display panel 15 as shown in FIG. 1. The indication of the cubic Bezier curve on the display panel 15 is renewed by renewal of the first handle point data $P_{n'}$ of the number "n" so that the cubic Bezier curve is formed in a desired configuration by operation of the user.

Figure 12:
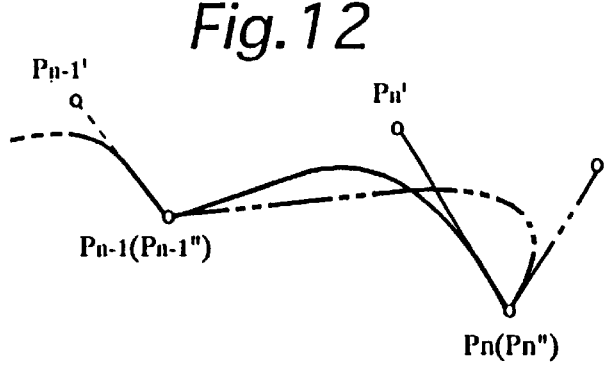
FIG. 12 illustrates a Bezier curve indicated on the display panel at a base point production mode.

In such definition of the control points as described above, the base point data Pn−1 and its first handle point data Pn−1' previously memorized become the same value as the designated coordinate pm when the mouse switch 13b has been turned on. As a result, the first and second control points of the cubic Bezier curve are defined as the same point. Thus, an inclination of the Bezier curve at its first control point or starting point becomes equal to an inclination of a straight line between the second control point (the second handle point of the number "n−1") and the third control point (the first handle point of the number "n". That is to say, when the first handle point of the number "n" is renewed, the inclination of the Bezier curve at its starting point is varied in accordance with renewal of the first handle point as illustrated in FIG. 12.

Accordingly, the terminal point of the preceding Bezier curve is defined as the starting point of the following Bezier curve, and each inclination of the following Bezier curve at its starting point and terminal point is varied by operation of the mouse switch 13b to form the following Bezier curve on the display panel in a desired configuration and to produce data indicative of the following Bezier curve.

If another processing mode is selected at step 108 during execution of the main program, the CPU 11 executives either one of processing at step 112 to 120. During the processing at step 112 to 120, the data memorized in the memory 12 by execution of the processing for base point production is renewed by operation of the mouse 13 and its switch 13b to indicate each Bezier curve in a desired configuration on the display panel 15.

Assuming that a base point displacement mode has been selected at step 108 of the main program, the CPU 11 renews at step 112 one of the base point data P memorized in the memory 12 to renew two Bezier curves whose starting and terminal points are defined by the base point represented by the base point data P, respectively. When the base point data P is renewed, the first and second handle point data P', P" corresponding with the base point P are renewed in accordance with variation of the base point data P to maintain relationship with the base point data P.

When a base point addition mode is selected at step 108 of the main program, the CPU 11 adds at step 114 a new base point between two base points continued in their numbers to indicate a curved line between the two base points as two Bezier curves whose starting and terminal points are defined by the new base point, respectively. For example, one of the data numbers memorized in the memory 12 is designated, and the data numbers following after the designated data number is added with "1" respectively. After addition of "1" to the respective data numbers, the base point data P of the designated number and its first and second handle point data P', P" and their handle display data F are newly added to indicate two Bezier curves whose starting and terminal points are respectively defined by the added base point. In addition, a terminal point designation variable "n" indicative of the last base point is added with "1" in accordance with increment of the data numbers for setting a new base point during processing at the following base point production mode.

When a base point deletion mode is selected, the program proceeds to step 116 where the CPU 11 deletes a middle base point from three base points continued in their numbers and defines a curved line between the remaining base points as a new Bezier curve. For example, one of the data numbers memorized in the memory 12 is designated, and the base point data P of the designated number and its first and second handle point data P', P" and their handle indication data P are removed from the memory 12. Thereafter, the data numbers following after the designated data number are respectively decreased with "1" to indicate a new Bezier curve defined by a base point of the prior number to the removed data number and a base point of the following number of the removed data number. In addition, the terminal point designation variable "n" indicative of the last base point is decreased with "1" for setting a new base point during processing at the following base point production mode.

When a handle displacement mode is selected at step 108 of the main program, the program proceeds to step 118 where the CPU 11 renews one of the first and second handle data P', P" memorized in the memory 12 to renew the indication of the Bezier curve defined by the handle point data P', P". In addition, with respect to the Bezier curve varied in its indication during processing at step 112 to 118, the second handle line and first handle line at the starting and terminal points of the Bezier curve are indicated on the display panel 15, and the data of the handle lines is set as "1".

Figure 7:
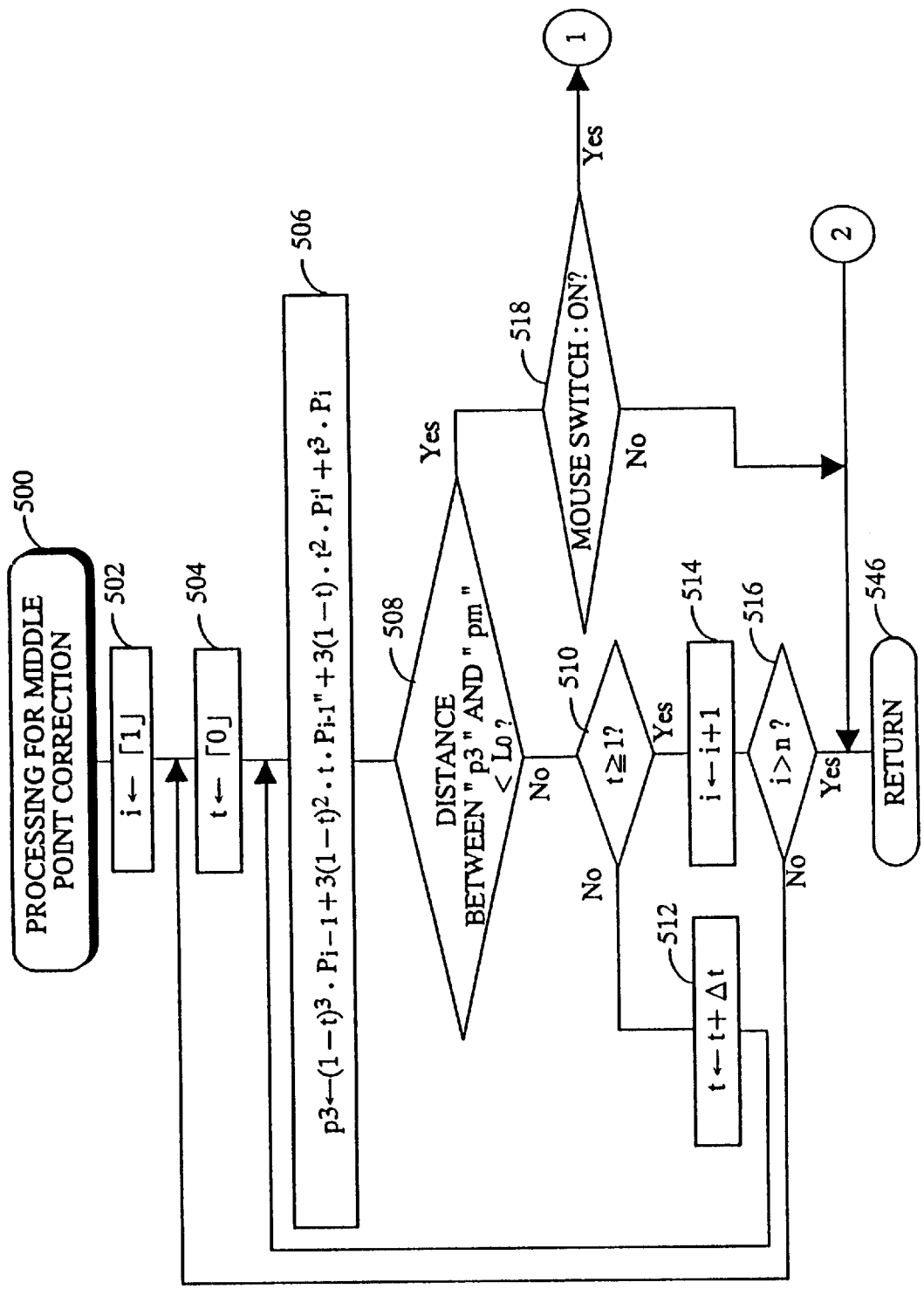
FIG. 7 is a flow chart of a front part of processing for middle point correction shown in FIG. 3.
Figure 8:
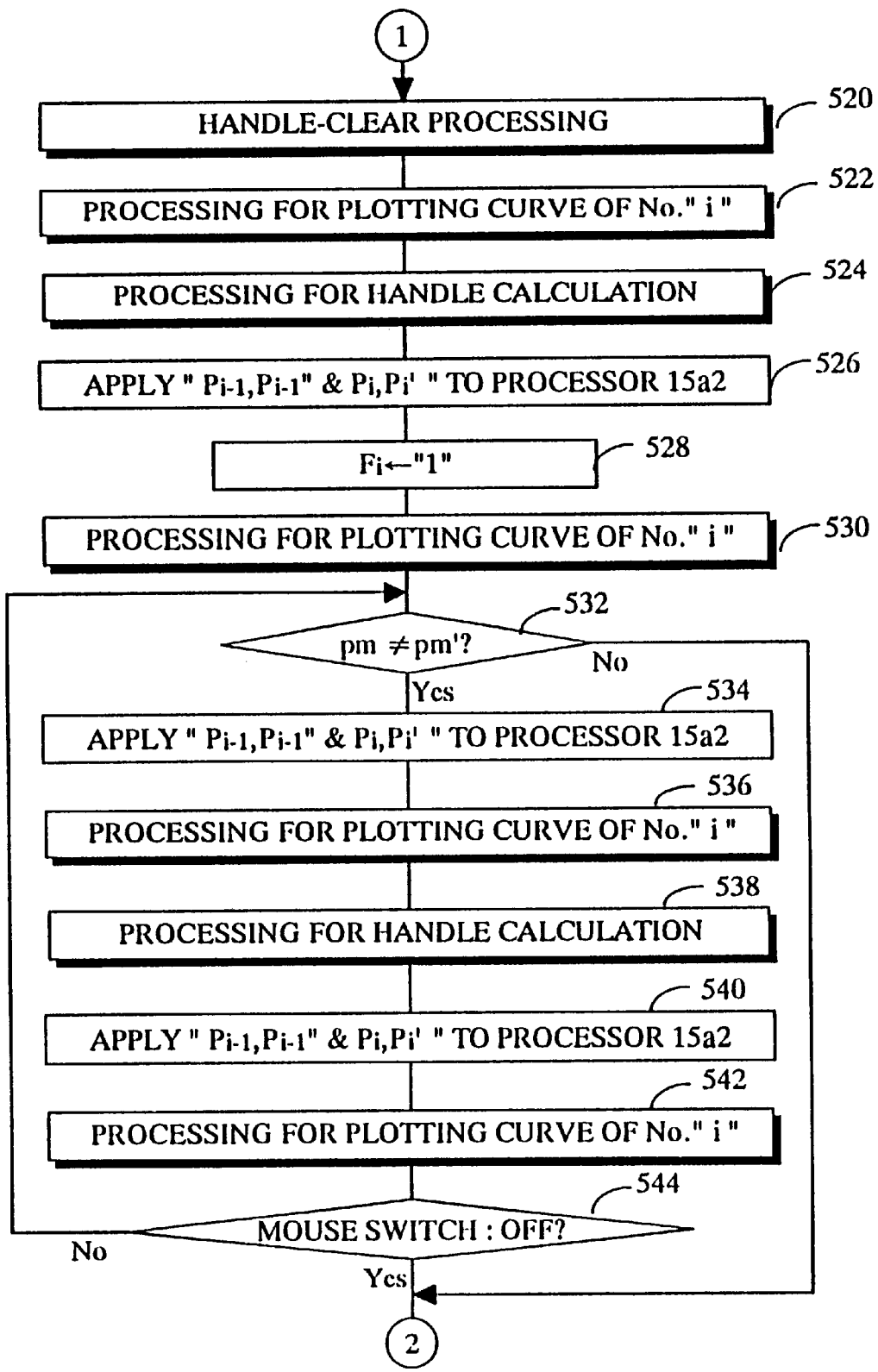
FIG. 8 is a flow chart of a rear part of the processing for middle point correction shown in FIG. 3.

When a middle point correction mode is selected at step 108 of the main program, the program proceeds to step 120 where the CPU 11 executes processing for middle point correction shown in FIGS. 7 and 8 for moving one point on the Bezier curve in accordance with operation of the mouse 13 to change the configuration of the Bezier curve. After started execution of the processing for middle point correction at step 500 shown in FIG. 7, the CPU 11 sets at step 502 a Bezier curve designation variable "i" to "1" and repeats execution of processing at step 504 to 518 for waiting designation of the Bezier curve to be varied. The designation of the Bezier curve is carried out when the mouse switch 13b is turned on in a condition where the mouse 13 is operated by the user to designate one point on the Bezier curve. In this instance, the CPU 11 successively increases the value of the Bezier curve designation variable "i" with "1" to determine whether the coordinate pm designated by the mouse 13 is located on the Bezier curve designated by the Bezier curve designation variable "i" or not. For determining the location of the designated coordinate pm, the CPU 11 increases at step 512 the value of parameter "t" with the minimal value Δt after setting the parameter "t" to "0" at step 504 and calculates one point on the Bezier curve as a third coordinate p3 based on the following equation (13) at step 506.

$$p3=(1-t)^3 \cdot P_{i-1}+3(1-t)^2 \cdot t \cdot P_{i-1''}+3(1-t) \cdot t^2 \cdot P_{i'}+t^3 \cdot P_i \quad (13)$$

Thus, the CPU 11 determines at step 508 whether a distance between the calculated third coordinate p3 and the designated coordinate pm is less than a predetermined distance L0 or not. When the value of parameter "t" is increased to "1" in a condition where the distance between the third coordinate p3 and the designated coordinate pm is more than the predetermined distance L0, the CPU 11 determines a "N" answer at step 508 and determines a "YES" answer at step 510. In this instance, the CPU 11 adds "1" to the Bezier curve designation variable "1" at step 514 and returns the program to step 504 for processing of the following Bezier curve. When the Bezier curve designation variable "i" is increase more than the terminal designation variable "n" without determination of a "Yes" answer at step 508 with respect to all the Bezier curves, the CPU 11 determines a "Yes" answer at step 516 and finishes execution of the processing for middle point correction at step 546.

Figure 9:
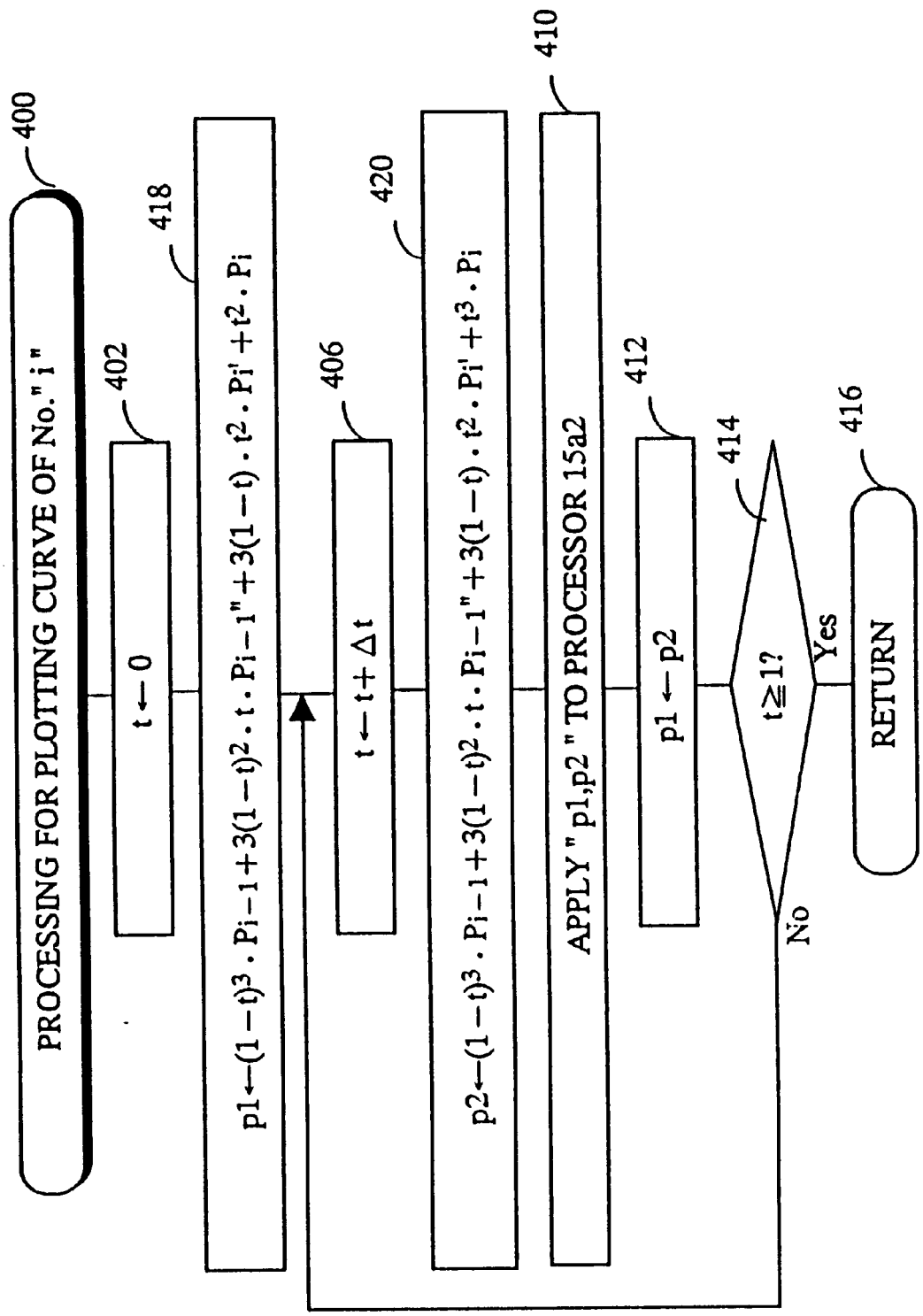
FIG. 9 is a flow chart of processing for plotting a curved line of No. "i" shown in FIG. 8.

If the answer at step 508 is "Yes", the CPU 11 determines at step 518 whether the mouse switch 13b is maintained in its on-position or not. If the answer at step 518 is "No", the CPU 11 finishes the processing for middle point correction at step 546. If the answer at step 518 is "Yes", the CPU 11 causes the program to proceed to step 520 for handle clear processing shown in FIG. 8. At step 520, the CPU 11 deletes all the handle lines indicated on the display panel 15 in the same manner as in the processing at step 214 shown in FIG. 4. Thereafter, the CPU 11 executes at step 522 processing for plotting a curve of the number "i" as shown in FIG. 9. In the processing for plotting a curve of the number "i", the following equations (14) and (15) are calculated at step 418 and 420 in stead of calculation of the equations (11) and (12) at step 404 and 408 shown in FIG. 6.

$$p1=(1-t)^3 \cdot P_{i-1}+3(1-t)^2 \cdot t \cdot P_{i-1''}+3(1-t) \cdot t^2 \cdot P_{i'}+t^3 \cdot P_i \quad (14)$$

$$p2=(1-t)^3 \cdot P_{i-1}+3(1-t)^2 \cdot t \cdot P_{i-1''}+3(1-t) \cdot t^2 \cdot P_{i'}+t^3 \cdot P_i \quad (15)$$

As a result of calculation of the equations (14) and (15), a Bezier curve of the number "i" defined by the data $P_{i-1'}$, $P_{i-1''}$, $P_{i'}$, $P_i$ is deleted from the display panel 15.

Figure 10:
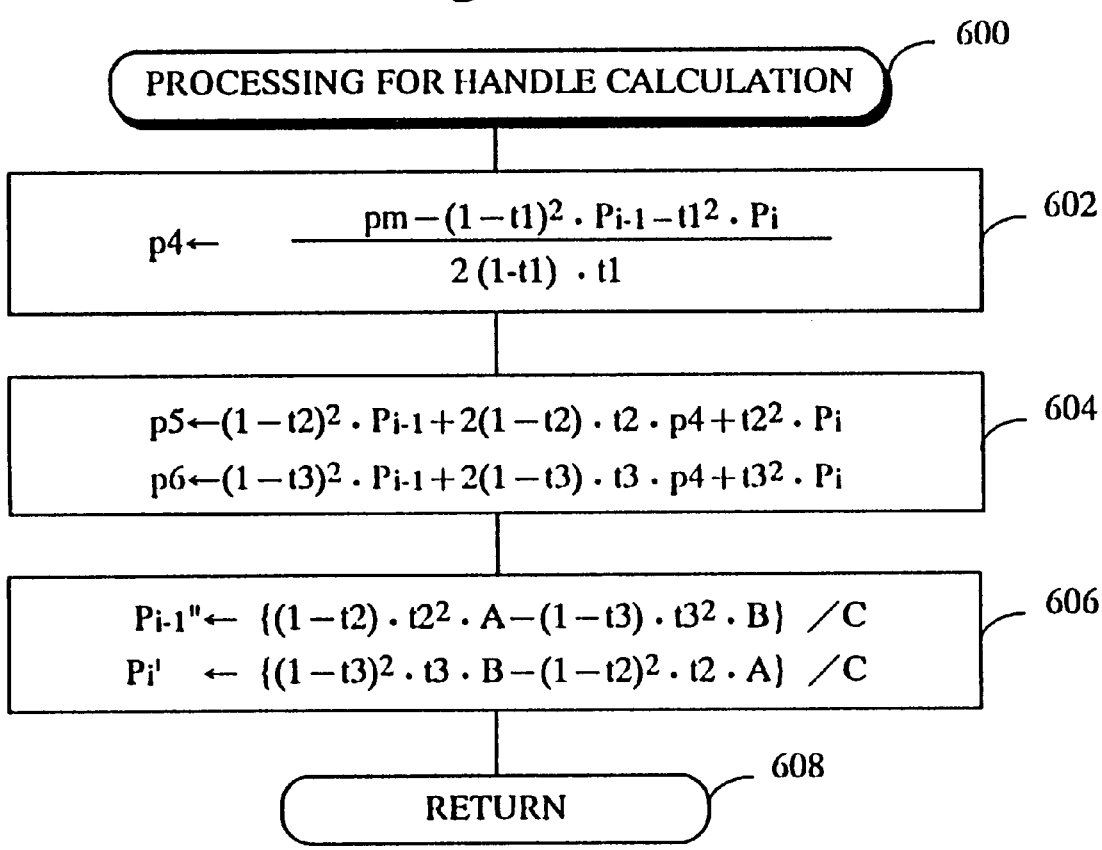
FIG. 10 is a flow chart of processing for handle calculation shown in FIG. 8.

After processing at step 522, the CPU 11 executes at step 524 processing for handle calculation shown in FIG. 10. The processing for handle calculation is programmed to calculate each handle point of a cubic Bezier curve including the designated coordinate pm as one point thereon. After started execution of the processing for handle calculation at step 600, the CPU 11 calculates at step 602 the following equation (16) to define a second control point of a square Bezier curve as a fourth coordinate p4. In this instance, the starting and terminal points of the square Bezier curve are respectively defined by the starting point (the base point of the number "i−1") and terminal point (the base point of the number "i") of a cubic Bezier curve designated by operation of the mouse 13 and its switch 13b, and the square Bezier curve includes the designated coordinate as one point thereon.

$$p^4 = \frac{pm - (1-t1)^2 \cdot P_{j-1} - 1 - t1^2 \cdot P_i}{2(1-t1) \cdot t1} \quad (16)$$

The equation (16) is derived from the equation (2), provided that each control point is defined as a position coordinate representing a base point data of the number "i−1", a fourth coordinate p4 and a base point data of the number "i", that the parameter "t" is defined as a first predetermined value $t_1$ (for example, "½"), and that a coordinate $P^2(t_1)$ of one point on a square Bezier curve given by the parameter $t_1$ is defined as the designated coordinate pm.

Subsequently, the CPU 11 calculates the following equations (17) and (18) at step 604 to define appropriate two points on the square Bezier curve as fifth and sixth coordinates p5 and p6.

$$p5=(1-t2)^2 P_{i-1}+2(1-t2)t2p4+t2^2 P_i \quad (17)$$

$$p6=(1-t3)^2 P_{i-1}+2(1-t3)t3p4+t3^2 P_i \quad (18)$$

The equations (17) and (18) correspond with the equation (2). In the case that the value of parameter "t" on the square Bezier curve including the designated coordinate pm as one point thereon is defined by second and third predetermined values t2 and t3 (for example, "⅓", "⅔"), a position coordinate $p^2$(t2), $p^2$(t3) of one point is defined as the fifth and sixth coordinates p5 and p6.

Subsequently, the CPU 11 calculates at step 106 the following equations (19)–(23) using the calculated fifth and sixth coordinates p5 and p6 to define second and third control points of a cubic Bezier curve equivalent to the square Bezier curve and to renew the second handle point data $P_{i-1}$ of the number "i-1" and the first handle point data $P_{i'}$ of the number "i" memorized in the memory 12 to a value indicative of the calculated second and third control points.

$$P_{i-1''}=\{(1-t2) \cdot t2^2 \cdot A-(1-t3) \cdot t3^2 \cdot B\}/C \quad (19)$$

$$P_{i'} = \{(1-t3)^1 \cdot t3 \cdot B - (1-t2)^2 \cdot t2 \cdot A\}/C \quad (20)$$

$$A = p6 - (1-t3)^3 \cdot P_{i-1} - t3^3 \cdot P_i \quad (21)$$

$$B = p5 - (1-t2)^3 \cdot P_{i-1} - t2^3 \cdot P_i \quad (22)$$

$$C = (1-t2) \cdot (1-t3) \cdot (2-t3) \cdot t3 t3 \quad (23)$$

With the foregoing processing, the handle point defining the Bezier curve (or each handle point data $P_{i-1''}$, $P_{i'}$) representing the second handle point of the number "i-1" and the first handle point of the number "i" is renewed so that the designated coordinate pm is located on the Bezier curve of the number "i". Thereafter, the CPU 11 finishes execution of the processing for handle calculation at step 608.

After execution of the processing for handle calculation, the CPU 11 applies the base point data $P_{i-1}$ of the number "i-1" and its second handle data $P_{i-1''}$, the base point data $P_i$ of the number "i" and its first handle point data $P_{i'}$ to the image processor 15a2 to indicate the second handle line of the number "i-1" and the first handle line of the number "i" on the display panel 15. In this instance, the CPU 11 sets the handle indication data $F_i$ of the number "i" to "1" at step 528 shown in FIG. 8 and executes at step 530 the processing for plotting the curve of the number "i" based on the renewed handle point data $P_{i-1''}$, $P_{i'}$ to indicate the Bezier curve of the number "i" renewed by the handle point data $P_{i-1''}$, $P_{i'}$ on the display panel 15.

Figure 13:
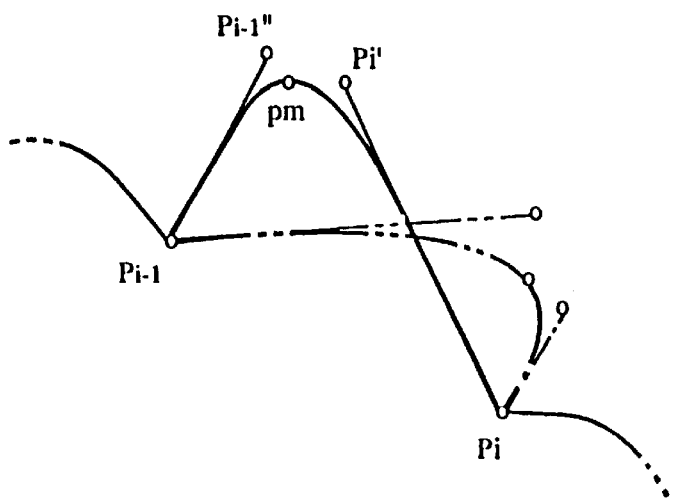
FIG. 13 illustrates a Bezier curve indicated on the display panel at a middle point correction mode.
Figure 14:
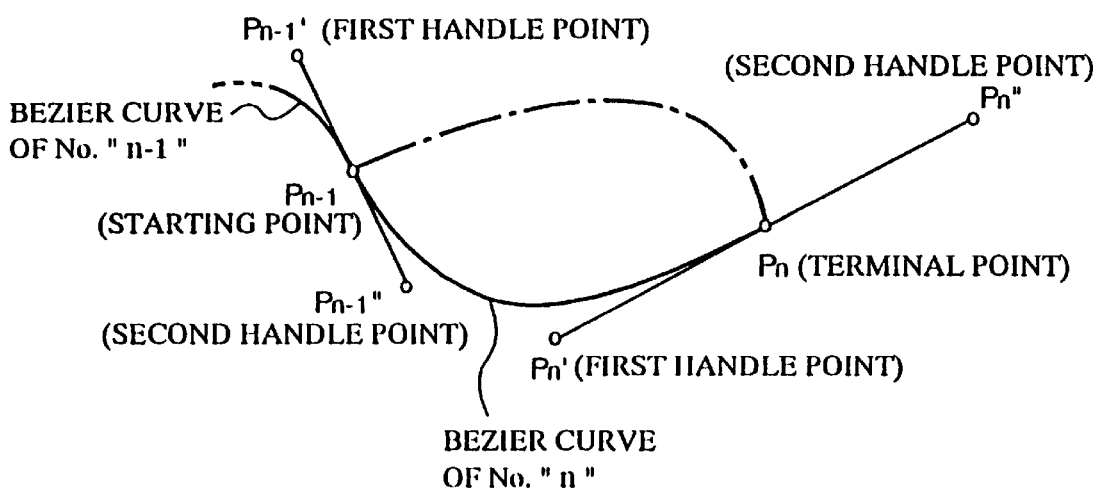
FIG. 14 illustrates a Bezier curve indicated on a display panel in the prior art.

Thereafter, the CPU 11 repeats execution of the processing at step 532 to 544 until the mouse switch 13b is turned off. During the processing at step 532 to 544, the handle point data $P_{i-1''}$, $P_{i'}$ each are renewed by input data applied from the mouse 13 to renew the indication on the display panel 15. When the designated coordinate pm is renewed by operation of the mouse 13 during the foregoing processing, the CPU 11 determines a "Yes" answer at step 532 and executes the processing at step 534 and 536 in the same manner as in the processing at step 526 and 530. As a result, the second handle line of the number "i-1" and the first handle line and Bezier curve of the number "i" are deleted from the display panel 15. Subsequently, the CPU 11 executes the processing for handle calculation at step 538 in the same manner as in the processing at step 524 to renew the second handle point data $P_{i-1''}$ of the number "i-1" and the first handle point data $P_{i'}$ of the number "i" memorized in the memory 12 so that the newly designated coordinated pm is included in the Bezier cursive of the number "i" at its one point. Thereafter, the CPU 11 executes the processing at step 540 and 542 in the same manner as in the processing at step 526 and 530. Thus, the second handle line of the number "i-1" and the first handle line and Bezier curve of the number "i" defined by the renewed data $P_{i-1''}$ and $P_{i'}$ are indicated on the display panel 15. During the processing at step 540 and 542, the Bezier curve of the number "i" indicated on the display panel 15 is formed in a desired configuration by operation of the mouse 13 in a condition where the mouse switch 13b is maintained in its on-position. (see FIG. 13). When the Bezier curve has been formed in the 2803 desired configuration, the mouse switch 13b is turned off. In this instance the CPU 11 determines a "Yes" answer at step 544 and finishes the processing for middle point correction at step 546 after determining a "Yes" answer at step 544.

From the above description, it will be understood that at the middle point correction mode, the Bezier curves indicated on the display panel 15 can be formed respectively in a desired configuration by renewal of a middle point thereof caused by operation of the mouse 13. In such operation of the mouse 13 for renewal of each middle point of the Bezier curves, variation of each configuration of the Bezier curves can be easily forecasted by the user.

When finished execution of the main program, the CPU 11 executes a program (not shown) for recording the curved line data memorized in the memory 12 into either one of the discs 16 to 18 or the host computer 22 and causes the printer 19 to print the curved line defined by the memorized data.

Although in the above-described embodiment, the programs were preliminarily recorded in either one of the discs 16 to 18 and read into the memory 12, the programs may be recorded in a read-only memory or ROM. Alternatively, the programs may be recorded in the host computer 22 to be applied into the memory 12 through the communication interface 21.

In actual practices of the present invention, the mouse 13 adapted as the coordinate input device may be replaced with a writing pen or a pointing device, and the position coordinate may be input by keep operation of the keyboard 14.

Although in the above-described embodiment, the square Bezier curve including the designated coordinate pm was obtained at the middle point correction mode so that the cubic Bezier curve equivalent with the square Bezier curve is indicated on the display panel 15, the square Bezier curve may be directly indicated on the display panel 15.

What is claimed is:

1. A method of indicating a curved line on a display panel of a computer device provided with a coordinate designation device, said method comprising the steps of:

setting first, second and third position coordinates designated by the coordinate designation device respectively as a starting point, a terminal point and a handle point at the terminal point;

connecting the starting point to the terminal point to indicate a Bezier curve on the display panel; and activating said coordinate designation device to designate a desired position coordinate for displaying the handle point at the terminal point to a new handle point defined by the desired position coordinate so that each inclination of the Bezier curve at the starting and terminal points is simultaneously varied in accordance with displacement of the handle point.

2. A method of indicating a curved line on a display panel of a computer device as in claim 1, further comprising the steps of:

setting the terminal point of said Bezier curve as a starting point of a new Bezier curve;

setting fourth and fifth position coordinates newly designated by said coordinate designation device respectively as a terminal point of the new Bezier curve and a handle point at the terminal point of the new Bezier curve;

connecting the starting and terminal points of the new Bezier curve to one another to indicate the new Bezier curve on the display panel; and activating said coordinate designation device to designate a desired position coordinate for displacing the handle point at the terminal point of the new Bezier curve to a new handle point defined by the desired position coordinate so that each inclination of the new Bezier curve at its starting and terminal points is simultaneously varied in accordance with displacement of the handle point defined by the fifth position coordinate.

3. An apparatus for indicating a curved line on a display panel of a computer device provided with a coordinate designation device, said apparatus comprising:

means for setting first, second and third position coordinates designated by the coordinate designation device respectively as a starting point, a terminal point and a handle point at the terminal point;

means for connecting the starting point to the terminal point to indicate a Bezier curve on the display panel of the computer device; and means for activating said coordinate designation device to designate a desired position coordinate for displaying the handle point at the terminal point to a new handle point defined by the desired position coordinate that each inclination of the Bezier curve at the starting and terminal points is simultaneously varied in accordance with displacement of the handle point.

4. An apparatus for indicating a curved line on a display panel of a computer device provided with a coordinate designation device, said apparatus comprising:

means for setting first and second position coordinates designated in pairs by the coordinate designation device respectively as a first base point and a first handle point at the first base point;

means for setting third and fourth position coordinates designated by the coordinate designation device respectively as a second base point and a second handle point at the second base point;

means for connecting the first base point to the second base point to indicate a Bezier curve on the display panel; and means for activating said coordinate designation device to designate a desired position coordinate for displacing the second handle point at the second base point to a new handle point defined by the desired position coordinate so that each inclination of the Bezier curve at the first and second base points is simultaneously varied in accordance with displacement of the second handle point.

5. A recording media for use in an apparatus for indicating a curved line on a display panel of a computer device provided with a coordinate designation device, wherein the recording media includes program data to set first, second and third position coordinates designated by the coordinate designation device respectively as a starting point, a terminal point and a handle point at the terminal point to connect the starting and terminal points to one another for indicating a Bezier curve on the display panel, and to cause said coordinate designation device to designate a desired position coordinate for displacing the handle point at the terminal point to a new handle point defined by the desired position coordinate so that each inclination of the Bezier curve at the starting and terminal points is simultaneously varied in accordance with displacement of the handle point.

6. A recording media for use in an apparatus for indicating a curved line on a display panel of a computer device provided with a coordinate designation device, wherein the recording media includes program data to set first and second position coordinates designated in pairs by the coordinate designation device respectively as a first base point and a first handle point at the first based point to connect the first base point to the second base point for indicating a Bezier curve on the display panel of said computer device and to cause said coordinate designation device to designate a desired position coordinate for displacing the second handle point at the second base point to a new handle point defined by the desired position coordinate so that each inclination of the Bezier curve at the first and second base points is simultaneously varied in accordance with displacement of the second handle point.

7. A method of producing a group of data representing a curved line composed of a plurality of continually connected cubic Bezier curves, said group of data including a plurality of standard point data representing position coordinates of standard points defined as each terminal point of the Bezier curves or each starting point of the following Bezier curves and plural sets of first and second handle point representing each position coordinate of first and second handle points at the standard points respectively, wherein the starting point, second handle point, firs handle point and terminal point are defined as control points in sequence, the production method of the group of data comprising the steps of:

newly producing a standard point data, a first handle point data and a second handle point data respectively at position coordinates designated by a coordinate designation device; and renewing only the newly produced first handle point data to a value indicative of a position coordinate designated by the coordinate designation device without causing any change of the other newly produced standard point data and second handle point date.

8. An apparatus for producing a group of data representing a curved line composed of a plurality of continually connected cubic Bezier curves, said group of data including a plurality of standard point data representing a position coordinates of standard points defining each terminal point of the Bezier curves as each starting point of the following Bezier curves and plural sets of first and second handle point data representing each position coordinate of first and second handle points at the standard points respectively, wherein the starting point, second handle point, first handle point and terminal point are defined as control points in sequence, the apparatus comprising:

memory means capable of memorizing the group of data;

a coordinate designation device for designating a position coordinate;

control means for causing said memory means to newly memorize a standard point data, a first handle point data and a second handle point data respectively at position coordinates designated by said coordinate designation device; and means for renewing only the newly memorized first handle point data to a value indicative of a position coordinate designated by said coordinate designation device without causing any change of the other newly produced standard point data and second handle point data.

9. A storage medium storing a program that is executable by a computer device, said program comprising the step of producing a group of data representing a curved line composed of a plurality of continually connected cubic Bezier curves, said group of data including a plurality of standard point data representing position coordinates of standard points defining each terminal point of the Bezier curves as each starting point of the following Bezier curves and plural sets of first and second handle point data representing each position coordinate of first and second handle points at the standard points respectively, wherein the starting point, second handle point, first handle point and terminal point are defined as control points in sequence, the program further comprising the steps of newly producing a standard point data, a first handle point data and a second handle point data respectively at position coordinate designated by a coordinate designation device; and renewing only the newly produced first handle point data to a value indicative of a position coordinate designated by the coordinate designation device without causing any change of the other newly produced standard point data and second handle point data.

10. A method of changing a configuration of a curved line defined by position coordinates of a starting point and a terminal point based on an input applied from a coordinate designation device and indicated on a display panel of a computer device, said method comprising the steps of:

deleting the curved line indicated on the display panel of said computer device;

determining a square Bezier curve including a position coordinate designated by the coordinate designation device;

calculating a control point other than a starting point and a terminal point of the square Bezier curve; and indicating a cubic Bezier curve equivalent to the square Bezier curve defined by the control point and the starting and terminal points of the square Bezier curve.

11. An apparatus for changing a configuration of a curved line defined by position coordinates of a starting point and a terminal point based on an input applied from a coordinate designation device and indicated on a display panel of a computer device, said apparatus comprising means for deleting the curved line indicated on the display panel of said computer device;

means for determining a square Bezier curve including a position coordinate designated by said coordinate designation device;

means for calculating a control point other than a starting point and a terminal point of the square Bezier curve; and means for indicating a cubic Bezier curve equivalent to the square Bezier curve defined by the control point and the staring and terminal points of the square Bezier curve.

12. A storage medium storing a program that is executable by a computer to effect the steps of:

deleting the curved line indicated on the display panel of said computer device;

determining a square Bezier curve including a position coordinate designated by said coordinate designation device;

calculating a control point other than a starting point and a terminal point of the square Bezier curve; and indicating a cubic Bezier curve equivalent to the square Bezier curve defined by the control point and the starting and terminal points of the square Bezier curve.

13. A data processing method applied to a computer device having memory means for memorizing a group of data representing a curved line composed of a plurality of continually connected cubic Bezier curves, said group of data including a plurality of standard point data representing position coordinates of standard points defining each terminal point of the Bezier curves as each starting point of the following Bezier curves and plural sets of first and second handle point data representing each position coordinate of first and second handle points at the standard points respectively, wherein the starting point, second handle point, first handle point and terminal point are defined as control points in sequence, the data processing method comprising the steps of:

designating one of the cubic Bezier curves;

calculating position coordinates of two standard points representing the starting and terminal points of the designated cubic Bezier curve as position coordinates of first and third control points on a basis of the standard point data memorized in said memory means and calculating a position coordinate of a second control point of a square Bezier curve including a position coordinate designated by said coordinate designation device;

calculating two position coordinates different from a starting point and a terminal point of a square Bezier curve defined by the calculated three control points;

defining the position coordinates of the two standard points as first and fourth control points and calculating position coordinates of second and third control points of a cubic Bezier curve including two points defined by the calculated two position coordinates;

renewing the second handle point data indicative of the position coordinate of the second handle point corresponding with the standard point defined as the staring point in the memorized group of data to a value indicative of the position coordinate of the calculated second control point of the cubic Bezier curve; and renewing the first handle point data indicative of the position coordinate of the first handle point corresponding with the standard point defined as the staring point in the memorized group of data to a value indicative of the position coordinate of the calculated third control point of the cubic Bezier curve.

14. An apparatus for changing a group of data representing a curved line composed of a plurality of continually connected cubic Bezier curves, said group of data including a plurality of standard point data representing position coordinates of standard points defining each terminal point of the Bezier curves as each starting point of the following Bezier curves and plural sets of first an second handle point data representing each position coordinate of first and second handle points at the standard points respectively, wherein the starting point, second handle point, first handle point and terminal point are defined as control points in sequence, the apparatus comprising:

memory means for memorizing the group of data representing the curved line;

a coordinate designation device for designating a position coordinate;

designation means for designating one of the cubic Bezier curves;

first calculation means for calculating position coordinates of two standard points representing the starting and terminal points of the designated cubic Bezier curve as position coordinates of first and third control points on a basis of the standard point data memorized in said memory means and calculating a position coordinate of a second control point of a square Bezier curve including a position coordinate designated by said coordinate designation device;

second calculation means for calculating two position coordinates different from a starting point and a terminal point of a square Bezier curve defined by the calculated three control points;

means for defining the position coordinates of the two standard points as first and fourth control points and calculating position coordinates of second and third control points of a cubic Bezier curve including two points defined by the calculated two position coordinates;

renewal means for renewing the second handle point data indicative of the position coordinate of the second handle point corresponding with the standard point defined as the starting point in the memorized group of data to a value indicative of the position coordinate of the calculated second control point of the cubic Bezier curve and for renewing the first handle point data indicative of the position coordinate of the first handle point corresponding with the standard point defined as the starting point in the memorized group of data to a value indicative of the position coordinate of the calculated third control point of the cubic Bezier curve.

* * * * *